US012503991B2

United States Patent
Williams et al.

(10) Patent No.: US 12,503,991 B2
(45) Date of Patent: Dec. 23, 2025

(54) FILTER OIL FORMULATION

(71) Applicant: K&N Engineering, Inc., Corona, CA (US)

(72) Inventors: Steve Williams, Cherry Valley, CA (US); Jere James Wall, Helendale, CA (US)

(73) Assignee: K&N Engineering, Inc., Corona, CA (US)

( * ) Notice: Subject to any disclaimer, the term of this patent is extended or adjusted under 35 U.S.C. 154(b) by 282 days.

(21) Appl. No.: 18/226,167

(22) Filed: Jul. 25, 2023

(65) Prior Publication Data

US 2023/0366368 A1    Nov. 16, 2023

Related U.S. Application Data

(60) Continuation-in-part of application No. 17/878,679, filed on Aug. 1, 2022, now abandoned, which is a
(Continued)

(51) Int. Cl.
*B01D 46/00* (2022.01)
*B01D 46/79* (2022.01)
(Continued)

(52) U.S. Cl.
CPC ......... *F02M 35/08* (2013.01); *B01D 46/0035* (2013.01); *B01D 46/79* (2022.01);
(Continued)

(58) Field of Classification Search
CPC ........................ B01D 46/0035; B01D 46/79; B01D 46/0082; C08K 5/01; C08K 5/101; F02M 35/08; F02M 35/086; F02M 35/024
(Continued)

(56) References Cited

U.S. PATENT DOCUMENTS 3,284,361 A * 11/1966 Rocchini ............. F02M 35/024
55/DIG. 24
6,136,058 A * 10/2000 Miller ..................... C03C 25/34
428/378
(Continued)

FOREIGN PATENT DOCUMENTS

GB    1206562    *  9/1970
GB    1206562 A  *  9/1970  ............. B01D 39/14

*Primary Examiner* — Frank M Lawrence, Jr.
(74) *Attorney, Agent, or Firm* — Rutan & Tucker LLP; Hani Z. Sayed

(57) ABSTRACT

A filter oil composition and a method for removing airborne molecular contaminants from air are provided. The composition includes a first portion comprising paraffinic oil by volume of the composition, a second portion comprising polyalphaolefin by volume of the composition, and a third portion comprising red dye by volume of the composition. Applying the filter oil composition to a cotton air filter material causes tackiness throughout the air filter material, thereby enhancing filtration of air passing through the filter. The composition generally is substantially non-reactive, has excellent oxidation stability, possesses good thermal stability, and retains a suitable viscosity at a normal operating temperature of an automobile engine. In an embodiment, the composition comprises 96.74% paraffinic oil by volume, 3.20% polyalphaolefin by volume, and 0.06% red dye by volume. The viscosity of the composition at 100 degrees-C ranges between substantially 7.2 and 7.6 centistokes (cSTs).

20 Claims, 1 Drawing Sheet

Related U.S. Application Data continuation of application No. 16/296,728, filed on Mar. 8, 2019, now Pat. No. 11,401,895, which is a division of application No. 14/701,163, filed on Apr. 30, 2015, now Pat. No. 10,294,897.

(60) Provisional application No. 61/986,782, filed on Apr. 30, 2014.

(51) Int. Cl.
*C08K 5/01* (2006.01)
*C08K 5/101* (2006.01)
*F02M 35/024* (2006.01)
*F02M 35/08* (2006.01)

(52) U.S. Cl.
CPC ................ *C08K 5/01* (2013.01); *C08K 5/101* (2013.01); *F02M 35/024* (2013.01); *F02M 35/086* (2013.01)

(58) Field of Classification Search
USPC ...... 55/385.3, 490, 524, DIG. 24; 123/198 E
See application file for complete search history.

(56) References Cited

U.S. PATENT DOCUMENTS

| | | | |
|---|---|---|---|
| 9,701,178 B2* | 7/2017 | Williams | B60H 3/0071 |
| 10,294,897 B2* | 5/2019 | Williams | F02M 35/024 |
| 10,434,466 B2* | 10/2019 | Williams | F24F 8/108 |
| 11,401,895 B2* | 8/2022 | Williams | F02M 35/024 |
| 2003/0150199 A1* | 8/2003 | Tanaka | B01D 39/1623 |
| | | | 55/486 |
| 2004/0083697 A1* | 5/2004 | Niakin | B01D 46/10 |
| | | | 55/486 |
| 2016/0279562 A1* | 9/2016 | Williams | F24F 8/125 |
| 2016/0317963 A1* | 11/2016 | Williams | B01D 46/0028 |
| 2020/0129906 A1* | 4/2020 | Williams | C08L 91/00 |

* cited by examiner

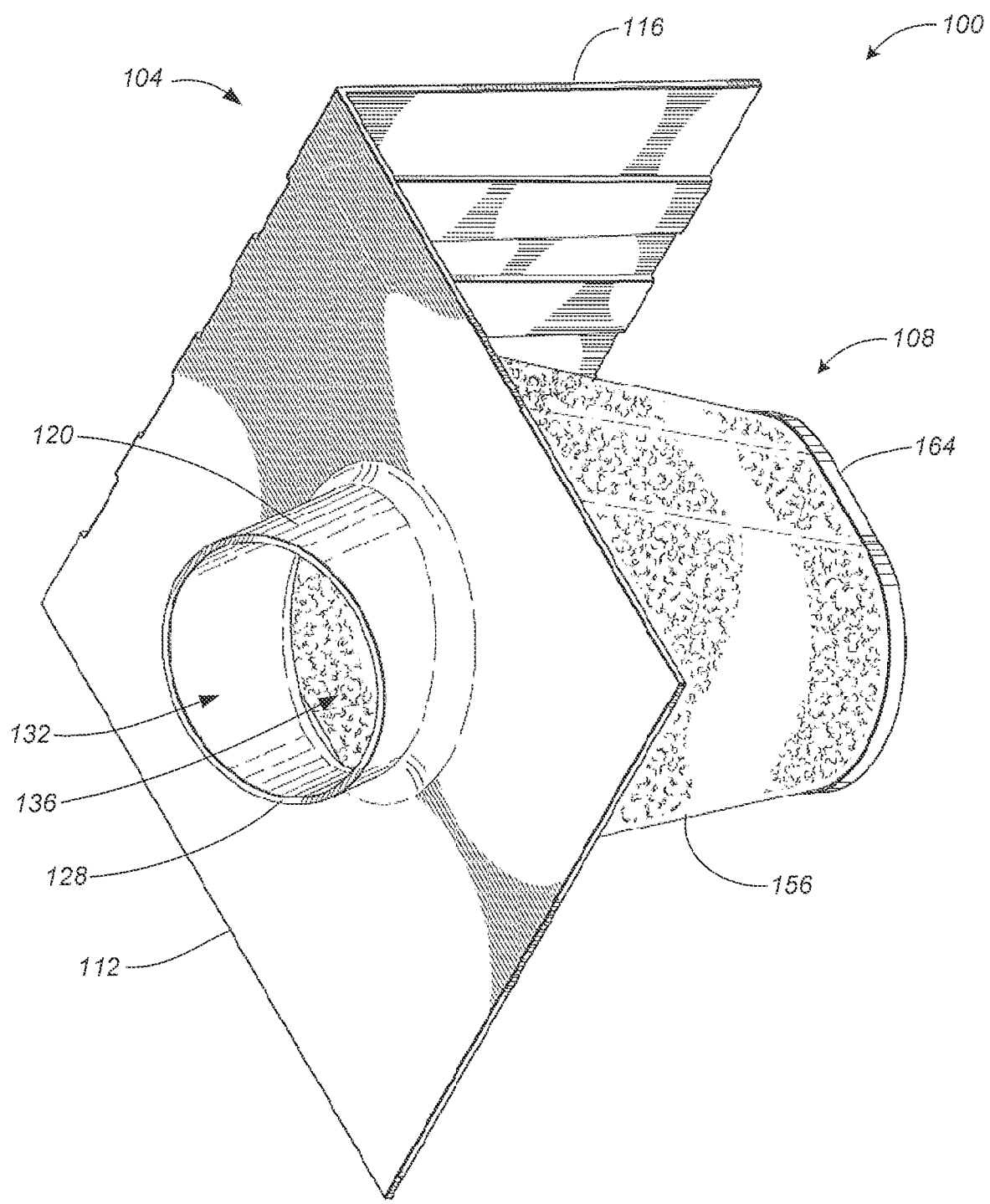

FILTER OIL FORMULATION

PRIORITY

This application is a continuation-in-part of U.S. patent application Ser. No. 17/878,679 filed on Aug. 1, 2022, which claims the benefit of priority to U.S. patent application Ser. No. 16/296,728 filed on Mar. 8, 2019 and U.S. patent application Ser. No. 14/701,163, filed Apr. 30, 2015, now issued U.S. Pat. No. 11,401,895, which claims the benefit of priority to U.S. Provisional Application No. 61/986,782, filed Apr. 30, 2014, all of which are entitled "Filter Oil Formulation", the entirety of which applications are incorporated herein by reference and made a part of the present disclosure.

FIELD

The field of the present disclosure generally relates to air filters. More particularly, the field of the present disclosure relates to a composition and a method for an air filter oil formulation for causing tackiness throughout an air filter material to enhance filtration of intake air of an automobile engine.

BACKGROUND

An air filter designed to remove particulate is generally a device composed of fibrous materials. These fibrous materials may remove solid particulates such as dust, pollen, mold, and bacteria from the air. Air filters are used in applications where air quality is important, notably in building ventilation systems and in automobile engines.

Air filters may be used in automobiles, trucks, tractors, locomotives and other vehicles that use internal combustion engines. Air filters may be used with gasoline engines, diesel engines, or other engines that run on fossil fuels or other combustible substances. Air filters may be used with engines in which combustion is intermittent, such as four-stroke and two-stroke piston engines, as well as other types of engines that take in air so as to burn a combustible substance. For example, air filters may be used with some gas turbines. Filters may also be used with air compressors or in other devices that take in air.

Filters may be made from pleated paper, foam, cotton, spun fiberglass, or other known filter materials. Generally, the air intakes of internal combustion engines and compressors tend to use paper, foam, or cotton filters. Some filters use an oil bath. Air filters for internal combustion engines prevents abrasive particulate matter from entering the engine's cylinders, where it would cause mechanical wear and oil contamination.

A drawback to paper air filters is that they must be thick, or the fibers must be tightly compressed and dense, which makes paper filters restrictive to air flow. Moreover, as a paper filter becomes more and more clogged with contaminants, the pressure inside the filter drops while the atmospheric air pressure outside the filter remains the same. When the pressure differential becomes too great, due to clogging, contaminants may be pulled through the restricted air filter into the engine. Thus, the performance of a paper air filter (i.e. air flow through the filter and its ability to protect the engine) decreases over the course of the filter's service life.

As will be appreciated by those skilled in the art, one way to reduce the clogging tendency of an air filter is by using a filter material having larger openings between the various fibers comprising the filter material. Of course, a more porous filter material may allow smaller particulate matter to pass through the air filter material, unless the fibers comprising the filter material are sufficiently tacky to cause smaller contaminants to cling to the fibers rather than passing through the air filter. Various oils are known to attract airborne contaminants. However, an oil suitable for use with an air filter must be relatively non-reactive, have an excellent oxidation stability, possess good thermal stability, and retain suitable viscosity at high operating temperatures typical of automobile engines. What is needed, therefore, is a suitably formulated filter oil composition for causing tackiness throughout the air filter material so as to enhance filtration of intake air to an automobile engine.

SUMMARY

An air filter oil composition and a method for removing airborne molecular contaminants from air are provided. The composition includes a first portion comprising paraffinic oil by volume of the composition, a second portion comprising polyalphaolefin by volume of the composition, and a third portion comprising red dye by volume of the composition. Applying the air filter oil composition to a cotton air filter material causes tackiness throughout the air filter material, thereby enhancing filtration of air passing through the filter. The composition generally is substantially non-reactive, has an excellent oxidation stability, possesses good thermal stability, and retains a suitable viscosity at a normal operating temperatures of an automobile engine. In an embodiment, the composition comprises 96.74% paraffinic oil by volume, 3.20% polyalphaolefin by volume, and 0.06% red dye by volume. A viscosity of the composition at 100 degrees-C ranges between substantially 7.2 and 7.6 centistokes (cSTs). In some embodiments, the filter material is configured to be periodically cleaned by way of a solvent to remove the air filter oil composition and a water hose to flush contaminants from the filter material. The filter material then is allowed to thoroughly dry before the air filter oil composition is reapplied to the filter material.

In an exemplary embodiment, an air filter oil composition comprises a first portion comprising paraffinic oil by volume of the composition; a second portion comprising polyalphaolefin by volume of the composition; and a third portion comprising red dye by volume of the composition; where applying the air filter oil composition to a cotton air filter material causes tackiness throughout the air filter material, thereby enhancing filtration of air flowing through the filter material.

In another exemplary embodiment, the composition is substantially non-reactive, has an excellent oxidation stability, possesses good thermal stability, and retains a suitable viscosity within a temperature range typical of an operating automobile engine. In another exemplary embodiment, the composition comprises 96.74% paraffinic oil by volume, 3.20% polyalphaolefin by volume, and 0.06% red dye by volume. In another exemplary embodiment, the composition has a viscosity at 100 degrees-C ranging between substantially 7.2 and 7.6 centistokes (cSTs).

In an exemplary embodiment, a method for removing airborne molecular contaminants from air comprises configuring a filter material to remove airborne molecular contaminants from an airstream passing through the filter material; formulating an air filter oil composition for application to the filter material, the air filter oil composition being configured to enhance air cleaning properties of the filter material; supporting the filter material such that the airstream is directed through the filter material; and cleaning the filter material periodically so as to remove entrapped contaminants.

In another exemplary embodiment, formulating comprises providing a first portion including paraffinic oil by volume of the composition, a second portion including polyalphaolefin by volume of the composition, and a third portion including red dye by volume of the composition, such that application of the composition to a cotton air filter material causes tackiness throughout the air filter material, thereby enhancing filtration of the airstream. In another exemplary embodiment, the composition is substantially non-reactive, has an excellent oxidation stability, possesses good thermal stability, and retains a suitable viscosity within a temperature range typical of an operating automobile engine. In another exemplary embodiment, the composition comprises 96.74% paraffinic oil by volume, 3.20% polyalphaolefin by volume, and 0.06% red dye by volume. In another exemplary embodiment, the composition has a viscosity at 100 degrees-C ranging between substantially 7.2 and 7.6 centistokes (cSTs).

In another exemplary embodiment, configuring comprises positioning at least one layer of cotton gauze between two epoxy-coated aluminum wire screens so as to support the filter material during filtering of the airstream. In another exemplary embodiment, supporting comprises positioning the filter material within an air intake of an internal combustion engine. In another exemplary embodiment, supporting comprises positioning the filter material within a ventilation system which circulates air within an enclosed space. In another exemplary embodiment, cleaning comprises removing the filter material from the airstream, using a solvent to remove the air filter oil composition, flushing contaminants and the solvent from the filter material by way of a water hose, allowing the filter material to dry, and uniformly applying the air filter oil composition to the filter material.

In an exemplary embodiment, an apparatus for removing airborne molecular contaminants from air comprises a filter material configured to remove airborne molecular contaminants from an airstream passing through the filter material; an air filter oil composition formulated for application to the filter material so as to enhance air cleaning properties of the filter material; and a support configured to orient the filter material such that the airstream is directed through the filter material.

In another exemplary embodiment, the air filter oil composition comprises a first portion including paraffinic oil by volume of the composition, a second portion including polyalphaolefin by volume of the composition, and a third portion including red dye by volume of the composition, such that application of the composition to the filter material causes tackiness throughout the filter material, thereby enhancing filtration of the airstream. In another exemplary embodiment, the air filter oil composition is substantially non-reactive, has an excellent oxidation stability, possesses good thermal stability, and retains a suitable viscosity within a temperature range typical of an operating automobile engine. In another exemplary embodiment, the air filter oil composition comprises 96.74% paraffinic oil by volume, 3.20% polyalphaolefin by volume, and 0.06% red dye by volume. In another exemplary embodiment, the air filter oil composition has a viscosity at 100 degrees-C ranging between substantially 7.2 and 7.6 centistokes (cSTs).

In another exemplary embodiment, the filter material comprises at least one layer of cotton gauze disposed between two epoxy-coated aluminum wire screens so as to support the filter material during filtering of the airstream. In another exemplary embodiment, the filter material is configured to be periodically cleaned by way of a solvent to remove the air filter oil composition, and a water hose to flush contaminants from the filter material.

In an exemplary embodiment, an air filter oil composition comprises: a first portion comprising one or more paraffinic base oils by percent weight of the composition; a second portion comprising polyalphaolefin by percent weight of the composition; a third portion comprising a tackifier for enhancing filtration of an airstream flowing through a filter medium; and a fourth portion comprising a liquid dye by percent weight of the composition.

In another exemplary embodiment, the first portion comprises a first paraffinic base oil and a second paraffinic base oil. In another exemplary embodiment, the first paraffinic base oil comprises 78.4% by weight of the composition and the second paraffinic base oil comprises 16.005% by weight of the composition. In another exemplary embodiment, the first paraffinic base oil comprises 67.977% by weight of the composition and the second paraffinic base oil comprises 31% by weight of the composition. In another exemplary embodiment, the first paraffinic base oil comprises 58.8% by weight of the composition and the second paraffinic base oil comprises 12% by weight of the composition.

In another exemplary embodiment, the second portion comprises 5.096% polyalphaolefin by weight of the composition. In another exemplary embodiment, the second portion comprises 3.8% polyalphaolefin by weight of the composition. In another exemplary embodiment, the third portion comprises between about 0.3% and about 1.0% tackifier by weight of the composition. In another exemplary embodiment, the third portion comprises 0.414% tackifier by weight of the composition. In another exemplary embodiment, the fourth portion comprises 0.1% liquid dye by weight of the composition. In another exemplary embodiment, the fourth portion comprises 0.085% liquid dye by weight of the composition. In another exemplary embodiment, the fourth portion comprises 0.023% liquid dye by weight of the composition.

In another exemplary embodiment, the composition comprises 78.4% of a first paraffinic base oil by weight, 16.005% of a second paraffinic base oil by weight, 5.096% polyalphaolefin by weight, 0.414% tackifier by weight, and 0.085% liquid dye by weight of the composition. In another exemplary embodiment, the composition comprises 67.977% of a first paraffinic base oil by weight, 31% of a second paraffinic base oil by weight, 1.0% tackifier by weight, and 0.023% liquid dye by weight of the composition. In another exemplary embodiment, the composition comprises 58.8% of a first paraffinic base oil by weight, 12% of a second paraffinic base oil by weight, 3.8% polyalphaolefin by weight, 0.3% tackifier by weight, and 0.1% liquid dye by weight of the composition. In another exemplary embodiment, the first paraffinic base oil ranges between about 58% and about 79% by weight of the composition. In another exemplary embodiment, the second paraffinic base oil ranges between about 12% and about 31% by weight of the composition.

In another exemplary embodiment, the polyalphaolefin ranges between 0% up to about 6% by weight of the composition. In another exemplary embodiment, the tackifier ranges between about 0.2% and 2.0% by weight of the composition. In another exemplary embodiment, the liquid dye ranges between about 0.02% and about 0.5% by weight of the composition.

These and other features of the concepts provided herein may be better understood with reference to the drawings, description, and appended claims.

BRIEF DESCRIPTION OF THE DRAWINGS

The drawings refer to embodiments of the present disclosure in which:

FIG. 1 is an upper perspective view of an exemplary embodiment of an air box with an integrated filter medium which may be treated with a filter oil composition causing tackiness throughout the air filter medium so as to enhance filtration of intake air to an automobile engine, in accordance with the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first driver," may be made. However, the specific numeric reference should not be interpreted as a literal sequential order but rather interpreted that the "first driver" is different than a "second driver." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes an air filter oil composition and a method for removing airborne molecular contaminants from an airstream. The composition includes a first portion comprising paraffinic oil by volume of the composition, a second portion comprising polyalphaolefin (PAO) by volume of the composition, and a third portion comprising red dye by volume of the composition. As described herein, applying the air filter oil composition to a cotton air filter material causes tackiness throughout the air filter material, thereby enhancing filtration of air passing through the filter. The composition generally is substantially non-reactive, has excellent oxidation stability, possesses good thermal stability, and retains a suitable viscosity at a normal operating temperature of an automobile engine. In some embodiments, the composition comprises 96.74% paraffinic oil by volume, 3.20% polyalphaolefin by volume, and 0.06% red dye by volume. The viscosity of the composition at 100 degrees-C ranges between substantially 7.2 and 7.6 centistokes (cSTs). In some embodiments, the filter material is configured to be periodically cleaned by way of a solvent to remove the air filter oil composition and a water hose to flush contaminants from the filter material. The filter material may then be dried, and the air filter oil composition reapplied before the filter is placed back into service.

FIG. 1 illustrates an exemplary embodiment 100 of an air box 104 with an integrated air filter 108 which may be treated with a filter oil composition so as to cause tackiness throughout the air filter medium, thereby enhancing filtration of intake air of an automobile engine, in accordance with the present disclosure. Although the embodiment of the air filter 108 illustrated in FIG. 1 is intended for filtration of air entering an automobile engine, the air filter 108 is not limited strictly to use with automobile engines. Rather, the air filter 108 may be incorporated into any environment wherein air filtration is desired or required. For example, the air filter 108 may be used to filter air circulated or directed to one or more enclosed spaces. In some embodiments, the air filter 108 may be used to filter air directed to enclosed spaces wherein passengers, drivers, as well as occupants reside, such as by way of non-limiting example, automobiles, trucks, recreational vehicles, buses, earthmoving equipment and tractors with enclosed cabins, crane operator cabins, various cargo moving vehicles, locomotives, rail passenger cars, airplanes, helicopters, ship cabins, airship cabins, and the like.

Moreover, the air filter 108 is not limited to being used in vehicles, but rather may be practiced in buildings and detached residential homes. In some embodiments, for example, the air filter 108 may be incorporated into a heating, ventilation, and air conditioning (HVAC) system so as to clean interior air being circulated within, or outside air being drawn into, a building or a residential home. As will be appreciated, the air filter 108 discussed herein and the filter oil composition of the present disclosure may be used with rooftop HVAC systems, central HVAC systems, wall-mounted HVAC systems, as well as portable HVAC systems, and the like.

In the embodiment illustrated in FIG. 1, the air box 104 comprises a housing portion 112 and a mount portion 116. The air box 104 generally is comprised of a material which is sufficiently durable and temperature resistant to retain its configuration during installation and operation when coupled with the air intake system of an automobile. The air box 104 generally is of an open variety, thereby improving airflow to the air filter 108, and thus improving engine performance beyond that otherwise possible with an enclosed air box. The mount portion 116 generally is configured to be mounted, or fastened, to the interior of an automobile engine bay.

The housing portion 112 generally is configured to support the air filter 108 and provide an interface between the air filter 108 and an intake portion of an automobile engine. A front side of the housing portion 112 comprises a conduit 120 that is configured to receive an air intake conduit extending to the intake portion of the automobile engine. Typically, a longitudinal dimension of the conduit 120 is positioned at an angle relative to the housing portion 112. Generally, the value of the angle between the conduit 120 and the housing portion 112 depends upon the particular automobile for which the air box 104 is to be utilized. Further, the conduit 120 comprises a flange 128 and an opening 132. The opening 132 serves the function of conducting air drawn through the air filter 108 into an interior cavity 136 of the filter into the air intake of the automobile engine. The specific configuration of the flange 128 and a diameter of the opening 132 generally depend upon the particular make and model of the engine for which the air box 104 is to be utilized.

With continuing reference to FIG. 1, the air filter 108 comprises a filter material 156 and a distal end cap 164. The distal end cap 164 may be affixed to the filter material 156 by way of any of a variety of fasteners (not shown) or may be molded to the air filter 108. The distal end cap 164 typically is comprised of a material which is sufficiently hard so as to retain the filter material 152 in the desired configuration and support the air filter 108 when coupled to the housing portion 112. As shown in FIG. 1, the filter material 156 circumferentially surrounds the interior cavity 136 such that the filter material 156 creates an exterior perimeter of at least a portion of the interior cavity 136. The filter material 156 generally provides a surface area through which to pass an air stream and trap particulate matter and other contaminates so as to prevent them from entering into the air intake of the automobile engine.

Preferably, a user of the air box 104 will periodically clean the air filter 108 rather than replacing the air filter as is typically done with conventional air filter systems. A straightforward method for cleaning the air filter 108 comprises removing the air intake conduit of the automobile engine from the conduit 120, inserting a water hose or other suitable spray nozzle through the opening 132 into the interior cavity 136 of the filter, and spraying water so as to flush contaminants from the filter material 156. Once the air filter is completely dry, a suitably formulated filter oil composition may be uniformly applied and allowed to wick into the filter material 156.

In an embodiment, the filter material 156 comprises 4 to 6 layers of cotton gauze sandwiched between two epoxy-coated aluminum wire screens. The cotton is advantageously treated with the above-mentioned suitably formulated filter oil composition for causing tackiness throughout microscopic strands comprising the filter material 156. The nature of the cotton allows high volumes of airflow, and when combined with the tackiness of the filter oil composition creates a powerful filtering medium which ensures a high degree of engine protection.

During operation of the automobile engine, contaminant particles cling to the fibers within the volume of the filter material 156 and become part of the filtering material 156, a process well known as "depth loading." As will be appreciated by those skilled in the art, depth loading allows the air filter 108 to capture and retain significantly more contaminants per unit of area than conventional paper filters. Contaminants collected on the surface of the air filter 108 have little effect on air flow during much of the filter's service life because there are no small holes for the contaminants to clog. Contaminant particles are stopped by layers of cotton gauze and held in suspension by the filter oil composition. Moreover, as the air filter 108 collects and increasing volume of contaminants and debris, an additional form of filtering action begins to take place because intake air must first pass through the trapped contaminants on the surface of the air filter 108 before passing through the filter medium 156. In essence, the trapped contaminants begin to operate as a filter material which precedes the filter material 156. Thus, the air filter 108 continues to exhibit a high degree of air flow and filtration throughout the service life of the filter.

Those skilled in the art will recognize that treating the filter material 156 with the filter oil composition generally enables the filter material 156 to capture contaminants by way of interception, whereby contaminants, such as by way of non-limiting example, dirt particles, traveling with the air stream directly contact the fibers comprising the filter material 156 and are then held in place by the filter oil composition. Larger or heavier particles are generally captured by way of impaction, whereby the inertia or momentum of the particles causes them to deviate from the path of the air flow stream through the filter material 156, and instead the particles run straight into the fibers and are captured by the filter oil composition.

Particle contaminants having very small sizes may be captured by way of diffusion. As will be appreciated, small particles are highly affected by forces within the air flow stream through the filter material 156. Forces due to velocity changes, pressure changes, and turbulence caused by other particles as well as interaction with air molecules, generally causes the small particles to follow random, chaotic flow paths through the filter material 156. Consequently, the small particles do not follow the air stream and their erratic motion causes them to collide with the fibers comprising the filter material 156 and remain captured by the filter oil composition. Diffusion and the filter oil composition enable the air filter 108 to capture particle contaminants having sizes that are much smaller than the openings between the fibers comprising the filter material 156. Furthermore, the filter oil composition enables the air filter 108 to capture contaminants throughout the volume of the filter material 156, rather than only on the surface of the filter as is common with conventional paper filters. The multiple layers of cotton fibers comprising the filter material 156 coupled with the tackiness provided by the filter oil composition provide many levels of contaminant retention, thereby enabling the air filter 108 to hold significantly more contaminants per unit of area of the filter material 156 than is possible with the conventional paper filters.

As will be appreciated, the filter oil composition of the present disclosure is critical to the air flow and filtration properties of the air filter 108. The filter oil composition preferably comprises an oil formulation which is non-reactive, has excellent oxidation stability, possesses good thermal stability, and retains suitable viscosity at normal operating temperatures of automobile engines. In some embodiments, the filter oil composition may be a mixture of oils and dyes (to provide color) suitable for enhancing the tackiness of the filter material 156, such as by way of non-limiting example, paraffinic oils, polyalphaolefins, and the like. In one embodiment, the filter oil composition comprises a mixture of 96.74% paraffinic oil by volume, 3.20% polyalphaolefin by volume, and 0.06% red dye by volume. In one embodiment, the filter oil composition has a viscosity at 100 degrees-C ranging between substantially 7.2 and 7.6 centistokes (cSTs). It is to be understood that the particular oils and dyes, as well as their colors or viscosities, and their individual concentrations within the filter oil composition may be altered without deviating from the spirit and the scope of the present disclosure.

In some embodiments, the filter oil composition may include a tackifier that is added to a mixture of oils and dyes to enhance the tackiness of the filter material 156. For example, in some embodiments, the filter oil composition may include PARATAC®, which is a tackifier based on a high molecular weight polyisobutylene (PIB) dissolved in a paraffinic base oil. It is contemplated that PARATAC® can help to prevent the filter oil composition from dripping, spattering, or being wiped off surfaces such as the filter medium 156. It is contemplated that the filter oil composition may comprise a weight percent of PARATAC® ranging between about 0.2% and about 2.0%. In one embodiment, for example, the filter oil composition comprises a mixture that includes a weight percent of PARATAC® of about 0.414% by weight of the filter oil composition. Further, in one embodiment, the filter oil composition comprises a mixture including a weight percent of PARATAC® of about 1.0% by weight of the filter oil composition.

It is contemplated that the filter oil composition may be configured to be applied to the filter medium 156 by way of aerosol and non-aerosol means. For example, in some embodiments, the filter oil composition may be configured to be applied to the filter medium 156 by way of a squeeze bottle or a pump spray bottle. In some embodiments, the filter oil composition is a mixture of a first portion comprising one or more paraffinic base oils, a second portion comprising polyalphaolefin, a third portion comprising a tackifier, and a fourth portion comprising a liquid dye for applying a color to the mixture. In one embodiment, the first portion comprises 78.4% paraffinic oil by weight, such as Safety-Kleen RHT 120, and 16.005% paraffinic oil by weight, such as Safety-Kleen RHT 240. Further, the second portion comprises 5.096% polyalphaolefin by weight, such as Safety-Kleen V534 OCP VM, the third portion comprises 0.414% tackifier by weight, such as PARATAC®, and the fourth portion comprises 0.085% red dye by weight, such as UNISOL® Red HF. In another exemplary embodiment, the first portion comprises 67.977% paraffinic oil by weight (e.g., Safety-Kleen RHT 120), and 31% paraffinic oil by weight (e.g., Safety-Kleen RHT 240), while the second portion is omitted. Continuing, the third portion comprises 1.0% tackifier by weight, such as PARATAC®, the fourth portion comprises 0.023% blue dye by weight, such as D55025 Chromatint® Blue HF Liquid.

As mentioned above, in some embodiments, the filter oil composition may be configured to be applied to the filter medium 156 by way of an aerosol spray. Similar to the embodiments described above, the filter oil composition may comprise a first portion comprising one or more paraffinic base oils, a second portion comprising polyalphaolefin, a third portion comprising a tackifier, and a fourth portion comprising a liquid dye for applying a color to the composition. In one embodiment, the first portion comprises 58.8% paraffinic oil by weight, such as Safety-Kleen RHT 120, and 12% paraffinic oil by weight, such as Safety-Kleen RHT 240. Further, the second portion comprises 3.8% polyalphaolefin by weight, such as Safety-Kleen V534 OCP VM, the third portion comprises 0.3% tackifier by weight, such as PARATAC®, and the fourth portion comprises 0.1% red dye by weight, such as UNISOL® Red HF.

Moreover, embodiments intended for aerosol sprays may comprise between about 15% and about 20% 1,1-Difluoroethane 152a, between about 1% and about 3% sodium nitrite, and up to about 3% silicone emulsion. As will be appreciated, 1,1-Difluoroethane 152a, or HFC-152a, is a colorless, odorless gas that may be utilized as a propellant in aerosol sprays. In the case of the filter oil composition, HFC-152a propels the composition out of an aerosol can and onto the filter medium 156. The HFC-152a helps to create a fine mist, which ensures that the filter oil composition is uniformly distributed throughout the filter medium 156.

Sodium nitrite is a well-known fixative and penetrating agent. As such, it is contemplated that sodium nitrite is well suited to stabilize the filter oil composition and prevent it from fading or running once applied to the filter medium 156. The sodium nitrite also helps the filter oil composition to be easily absorbed into the filter medium 156, as well as ensuring that the filter oil composition is distributed substantially uniformly throughout the filter medium 156. Further, sodium nitrite can help the filter oil composition more resistant to the effects of light, heat, and other environmental factors.

Silicone emulsion may be included in the filter oil composition to serve as a binder. It is contemplated that the silicone emulsion operates by forming a thin film on the surface of the filter medium 156, and thus helps to protect the colored dye comprising the filter oil composition from the elements and makes the dye more resistant to fading or running. Further, silicone emulsion is a water-resistant substance that can improve the water repellency of the filter medium 156 once it is treated with the filter oil composition.

Methods provided herein for removing airborne molecular contaminants from air may, in some embodiments, comprise configuring a filter medium 156 to remove airborne molecular contaminants from an airstream passing through the filter medium 156. In some embodiments, configuring the filter medium 156 comprises positioning at least one layer of cotton gauze between two epoxy-coated aluminum wire screens so as to support the filter medium 156 during filtering of the airstream.

The methods provided herein may include, in some embodiments, formulating an air filter oil composition for application to the filter medium 156, wherein the air filter oil composition is configured to enhance air cleaning properties of the filter medium 156. In some embodiments, formulating the air filter oil composition may comprise providing a first portion including paraffinic oil by volume of the composition, a second portion including polyalphaolefin by volume of the composition, and a third portion including red dye by volume of the composition, such that application of the composition to a cotton air filter medium 156 causes tackiness throughout the air filter medium 156, thereby enhancing filtration of the airstream.

In some embodiments, formulating the air filter oil composition may include formulating an air filter oil composition that is substantially non-reactive, has an excellent oxidation stability, possesses good thermal stability, and retains a suitable viscosity within a temperature range typical of an operating automobile engine. Formulating the air filter oil composition may include, in some embodiments, formulating an air filter oil composition that comprises 96.74% paraffinic oil by volume, 3.20% polyalphaolefin by volume, and 0.06% red dye by volume. Further, formulating the air filter oil composition may include formulating an air filter oil composition that has a viscosity at 100 degrees-C ranging between substantially 7.2 and 7.6 centistokes (cSTs).

Methods provided herein may further comprise supporting the filter medium 156 such that the airstream is directed through the filter medium 156. In some embodiments, supporting the filter medium 156 may comprise positioning the filter medium 156 within an air intake of an internal combustion engine. Further, supporting the filter medium 156 may, in some embodiments, comprise positioning the filter medium 156 within a ventilation system which circulates air within an enclosed space wherein passengers, drivers, as well as occupants reside. Enclosed spaces contemplated include, by way of non-limiting example, automobiles, trucks, recreational vehicles, buses, earthmoving equipment and tractors with enclosed cabins, crane operator cabins, various cargo moving vehicles, locomotives, rail passenger cars, airplanes, helicopters, ship cabins, airship cabins, and the like. It is further contemplated that the air filter 108 described herein is not to be limited to vehicles, but rather may be practiced in buildings and detached residential homes. For example, the air filter 108 may be incorporated into a heating, ventilation, and air conditioning (HVAC)

system so as to clean interior air being circulated within, or outside air being drawn into, a building or a residential home.

Methods provided herein for removing airborne molecular contaminants from air may, in some embodiments, further comprise cleaning the filter medium 156 periodically so as to remove entrapped contaminants. Cleaning the filter material may comprise, in some embodiments, removing the filter medium 156 from the airstream, using a solvent to remove the air filter oil composition, flushing contaminants and the solvent from the filter medium 156 by way of a water hose, allowing the filter medium 156 to dry, and uniformly applying the air filter oil composition to the filter medium 156.

Methods provided herein for an air filter oil composition may, in some embodiments, comprise providing a first portion comprising one or more paraffinic base oils by percent weight of the composition. The one or more paraffinic base oils may, in some embodiments, comprise a first paraffinic base oil and a second paraffinic base oil. In some embodiments, the first paraffinic base oil comprises about 78.4% by weight of the composition and the second paraffinic base oil comprises about 16.005% by weight of the composition. In some embodiments, the first paraffinic base oil comprises about 67.977% by weight of the composition and the second paraffinic base oil comprises about 31% by weight of the composition. Further, In some embodiments, the first paraffinic base oil comprises about 58.8% by weight of the composition and the second paraffinic base oil comprises about 12% by weight of the composition.

The methods provided herein may include providing a second portion comprising polyalphaolefin by percent weight of the composition. The second portion may, in some embodiments, comprise about 5.096% polyalphaolefin by weight of the composition. In some embodiments, the second portion may comprise about 3.8% polyalphaolefin by weight of the composition.

In some embodiments, the methods provided herein may include providing a third portion comprising a tackifier for enhancing filtration of an airstream flowing through a filter medium. The third portion may comprise, in some embodiments, between about 0.3% and about 1.0% tackifier by weight of the composition. In one embodiment, the third portion comprises 0.414% tackifier by weight of the composition.

Further, in some embodiments, the methods provided herein may include providing a fourth portion comprising a liquid dye by percent weight of the composition. In some embodiments, the fourth portion may comprise 0.1% liquid dye by weight of the composition. In some embodiments, the fourth portion may comprise 0.085% liquid dye by weight of the composition. Further, in some embodiments, the fourth portion may comprise 0.023% liquid dye by weight of the composition.

The methods provided herein may include mixing a filter oil composition comprising about 78.4% of a first paraffinic base oil by weight, about 1$^6$0.005% of a second paraffinic base oil by weight, about 5.096% polyalphaolefin by weight, about 0.414% tackifier by weight, and about 0.085% liquid dye by weight of the composition. In some embodiments, the composition may comprise about 67.977% of a first paraffinic base oil by weight, about 31% of a second paraffinic base oil by weight, about 1.0% tackifier by weight, and about 0.023% liquid dye by weight of the composition. Further, in some embodiments, the composition may comprise about 58.8% of a first paraffinic base oil by weight, about 12% of a second paraffinic base oil by weight, about 3.8% polyalphaolefin by weight, about 0.3% tackifier by weight, and about 0.1% liquid dye by weight of the composition.

Moreover, in some embodiments, the first paraffinic base oil may range between about 58% and about 79% by weight of the composition. In some embodiments, the second paraffinic base oil may range between about 12% and about 31% by weight of the composition. In some embodiments, the polyalphaolefin may range between 0% up to about 6% by weight of the composition. Further, in some embodiments, the tackifier may range between about 0.2% and 2.0% by weight of the composition. Further, the liquid dye may, in some embodiments, range between about 0.02% and about 0.5% by weight of the composition.

It should be understood that the air filter 108 is not to be limited to use in an intake portion of an automobile engine, but rather may be used to filter air circulated or directed to enclosed spaces, such as enclosed space wherein passengers, drivers, as well as occupants reside, such as by way of non-limiting example, automobiles, trucks, recreational vehicles, buses, earthmoving equipment and tractors with enclosed cabins, crane operator cabins, various cargo moving vehicles, locomotives, rail passenger cars, airplanes, helicopters, ship cabins, airship cabins, and the like. Moreover, the air filter 108 is not to be limited to vehicles, but rather may be practiced in buildings and detached residential homes. For example, the air filter 108 may be incorporated into a heating, ventilation, and air conditioning (HVAC) system so as to clean interior air being circulated within, or outside air being drawn into, a building or a residential home. It should be understood, therefore, that the air filter discussed herein and the filter oil composition of the present disclosure may be used with rooftop HVAC systems, central HVAC systems, wall-mounted HVAC systems, as well as portable HVAC systems, and the like.

While the invention has been described in terms of particular variations and illustrative FIGURES, those of ordinary skill in the art will recognize that the invention is not limited to the variations or FIGURES described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. An air filter oil composition, comprising:
   a first portion comprising one or more paraffinic base oils by percent weight of the composition;
   a second portion comprising polyalphaolefin by percent weight of the composition;
   a third portion comprising a tackifier for enhancing filtration of an airstream flowing through a filter medium; and
   a fourth portion comprising a liquid dye by percent weight of the composition.

2. The composition of claim 1, wherein the first portion comprises a first paraffinic base oil and a second paraffinic base oil.

3. The composition of claim 2, wherein the first paraffinic base oil comprises 78.4% by weight of the composition and the second paraffinic base oil comprises 16.005% by weight of the composition.

4. The composition of claim 2, wherein the first paraffinic base oil comprises 67.977% by weight of the composition and the second paraffinic base oil comprises 31% by weight of the composition.

5. The composition of claim 2, wherein the first paraffinic base oil comprises 58.8% by weight of the composition and the second paraffinic base oil comprises 12% by weight of the composition.

6. The composition of claim 1, wherein the second portion comprises 5.096% polyalphaolefin by weight of the composition.

7. The composition of claim 6, wherein the second portion comprises 3.8% polyalphaolefin by weight of the composition.

8. The composition of claim 1, wherein the third portion comprises between about 0.3% and about 1.0% tackifier by weight of the composition.

9. The composition of claim 8, wherein the third portion comprises 0.414% tackifier by weight of the composition.

10. The composition of claim 1, wherein the fourth portion comprises 0.1% liquid dye by weight of the composition.

11. The composition of claim 10, wherein the fourth portion comprises 0.085% liquid dye by weight of the composition.

12. The composition of claim 1, wherein the fourth portion comprises 0.023% liquid dye by weight of the composition.

13. The composition of claim 1, wherein the composition comprises 78.4% of a first paraffinic base oil by weight, 16.005% of a second paraffinic base oil by weight, 5.096% polyalphaolefin by weight, 0.414% tackifier by weight, and 0.085% liquid dye by weight of the composition.

14. The composition of claim 1, wherein the composition comprises 67.977% of a first paraffinic base oil by weight, 31% of a second paraffinic base oil by weight, 1.0% tackifier by weight, and 0.023% liquid dye by weight of the composition.

15. The composition of claim 1, wherein the composition comprises 58.8% of a first paraffinic base oil by weight, 12% of a second paraffinic base oil by weight, 3.8% polyalphaolefin by weight, 0.3% tackifier by weight, and 0.1% liquid dye by weight of the composition.

16. The composition of claim 2, wherein the first paraffinic base oil ranges between about 58% and about 79% by weight of the composition.

17. The composition of claim 16, wherein the second paraffinic base oil ranges between about 12% and about 31% by weight of the composition.

18. The composition of claim 17, wherein the polyalphaolefin ranges between 0% up to about 6% by weight of the composition.

19. The composition of claim 18, wherein the tackifier ranges between about 0.2% and 2.0% by weight of the composition.

20. The composition of claim 19, wherein the liquid dye ranges between about 0.02% and about 0.5% by weight of the composition.

* * * * *